(12) United States Patent
Couch (10) Patent No.: US 9,100,290 B2
(45) Date of Patent: Aug. 4, 2015

(54) CHARACTERIZING CABLE LEAKAGE INTERFERENCE PRIORITIES ON LTE

(75) Inventor: Kenneth W. Couch, Harrisonburg, VA (US)

(73) Assignee: ComSonics, Inc., Harrisonburg, VA (US)

( * ) Notice: Subject to any disclaimer, the term of this patent is extended or adjusted under 35 U.S.C. 154(b) by 350 days.

(21) Appl. No.: 13/479,572

(22) Filed: May 24, 2012

(65) Prior Publication Data

US 2013/0316750 A1   Nov. 28, 2013

(51) Int. Cl.
| H04B 17/00 | (2006.01) |
| H04W 24/00 | (2009.01) |
| H04L 12/24 | (2006.01) |
| H04L 12/26 | (2006.01) |
| H04B 17/318 | (2015.01) |
| H04B 17/345 | (2015.01) |

(52) U.S. Cl.
CPC ........ *H04L 41/0609* (2013.01); *H04L 41/0618* (2013.01); *H04L 43/08* (2013.01); *H04B 17/318* (2015.01); *H04B 17/345* (2015.01)

(58) Field of Classification Search
CPC ..... H04W 24/02; H04W 24/04; H04W 24/10; H04L 41/0609; H04L 41/0618; H04L 41/0654
USPC ................ 455/67.11, 423–425, 562.1, 67.13; 370/241, 242, 244–245
See application file for complete search history.

(56) References Cited

U.S. PATENT DOCUMENTS

| 6,625,745 | B1 * | 9/2003 | Johnson et al. ................ 714/4.4 |
| 8,578,437 | B2 * | 11/2013 | Nielsen et al. ................ 725/125 |
| 2005/0062475 | A1 * | 3/2005 | Nakanishi et al. ............ 324/326 |
| 2005/0120196 | A1 * | 6/2005 | Zito ............................. 713/100 |
| 2011/0085456 | A1 * | 4/2011 | Zimmerman ................ 370/252 |
| 2012/0116697 | A1 * | 5/2012 | Stelle, IV ........................ 702/59 |
| 2013/0051239 | A1 * | 2/2013 | Meredith et al. ............. 370/241 |

OTHER PUBLICATIONS

Paul Denisowski, "Recognizing and Resolving LTE/CATV Interference Issues" Keywords: LTE, Interference, Ingress, Egress, Leakage, pp. 1-8.

(Continued)

*Primary Examiner* — Simon Nguyen
(74) *Attorney, Agent, or Firm* — McGinn IP Law Group, PLLC (57) ABSTRACT

A method and structure for conforming to cable leakage compliance level requirements includes calculating, using a processor on a computer, a priority of repairs for cable leakage over a cable operator service area. A result of the priority calculation is provided, thereby permitting higher priority leaks to be identified and repaired. The calculating of priority includes storing geographical locations of cell towers affecting a service area being evaluated, receiving data related to cable leakage sources, receiving data related to wireless service quality, if available, and exercising, using the processor on the computer, a prioritizing algorithm that calculates a relative severity of each cable leakage source.

20 Claims, 5 Drawing Sheets

(56) References Cited

OTHER PUBLICATIONS

Ron Hranac, "Communication Technology Empowering Broadband Professionals", Some thoughts on LTE Interference: Communications Technology, http://ww.cabe360.net/ct/sections/columns/broadband/48482.html, pp. 1-3.

Ron Hranac, "Communications technology empowering broadband Professionals", LTE Interference (Part 2): Communications Technology, http://www.cable360.net/ct/operations/testing48917.html, pp. 1-3.

* cited by examiner

CHARACTERIZING CABLE LEAKAGE INTERFERENCE PRIORITIES ON LTE

BACKGROUND OF THE INVENTION

1. Field of the Invention

The present invention generally relates to a method of objectively calculating a priority for repair of cable leakage interference to Long Term Evolution (LTE) cellular service. More specifically, parameters and metrics are identified, as incorporated in a software-implemented tool, to permit cable operators to establish priorities for repair of cable leaks in their system.

2. Description of the Related Art

The Federal Communication Commission (FCC) protects the use of over-the-air frequencies based on their allocation of use. Anyone or anything that causes unauthorized interference on over-the-air frequencies is subject to the rules and regulations set by FCC. One such protected air space is the FAA band used for aircraft communications which is generally located between 108 MHz and 137 MHz. This same frequency band is used by cable operators for cable TV services.

However, their signaling is distributed through hardline cable infrastructure. In order to prevent interference caused by the cable TV signals in the over-the-air FAA band, cable operators must ensure that their cable infrastructure does not allow the cable signals to escape into the air, often referred to as "cable leakage." If the shielding integrity of their cable infrastructure is compromised in such a manner that cable leakage escapes into the FAA band, the cable operators are required to repair their infrastructure to eliminate these leaks.

In order to ensure that cable operators are in compliance with non-interference in the FAA band, the FCC has mandated that cable operators will report that at least 75% of their cable plant every year has been checked, record any leaks found, and fix the leaks to a point where the Cumulative Leakage Index (CLI) is below the threshold set by the FCC. Operators must also monitor their leakage by substantially covering their plant every three months. Records must be kept on file validating that the cable operators have checked their cable plant four times each year and they must keep records of all leaks found greater than 20 uV/m at 3 meters.

With the emergence of the new 4G Cellular service or Long Term Evolution (LTE) located in the 700 MHz to 800 MHz frequency domain and potentially 600 MHz to 700 MHz in the future, there are early reports and studies that show cable leakage in this frequency band is interfering with the LTE service. The LTE signaling, by its nature, is more sensitive to certain types of interference than the previous cellular technologies such as Edge and 3G. While the FCC has not yet created specific regulations for the cable operators to monitor and report such interference, the standing rule still applies that no unauthorized interference can exist in over-the-air services.

This creates several technical problems for cable operators as more and more LTE equipment is deployed:

1) The majority of cable channels in the LTE band are modulated using digital QAM (Quadrature Amplitude Modulation) versus analog carriers, which in turn produces "digital leakage" when there are integrity flaws in the cable plant. The current cable leakage detection equipment deployed by cable operators is analog-based, which means their existing equipment cannot detect the digital leakage. Cable operators will need new equipment that is capable of detecting digital leakage;

2) Unlike the FAA band, LTE signaling has a vast distribution network consisting of cellular towers and handheld cell phones. This means that the power level of the LTE signal will vary greatly depending on the distance from the cell towers and terrestrial obstructions such as buildings, tunnels, mountains, etc. The LTE signal quality from either the cellular tower and/or the handheld device will affect the amount of interference that a cable leak will have on the LTE signal, making it difficult to determine which leaks are causing the most damaging interference;

3) The digital leaks also vary in power level, which adds another variable further complicating the ability to determine the impact severity a leak is causing on the LTE signaling. Generally, the higher the power level of the leak, the more potential it has of causing harmful interference. In order to meet the FCC CLI guidelines, cable operators typically prioritize which leaks to fix based on the leak power level—the higher the leak power level, the higher the priority to repair the leak. However, the ability to prioritize leaks that are causing harmful LTE interference is now much more complex than merely using the leak power level on its own.

For example, a small leak which was conventionally considered to be low impacting in the FAA domain may now be a much bigger problem from an LTE perspective. If a small cable leak exists where the LTE service has poor performance, it may cause enough interference to further deteriorate the LTE service below an acceptable operating point.

In summary, cable operators will need to find and fix cable leakage that is causing harmful interference in the LTE band. They will need both new products and tools to help them detect and characterize the severity of the interference so they can prioritize their resources to fix these leaks accordingly.

SUMMARY OF THE INVENTION

In view of the foregoing, and other, exemplary problems, drawbacks, and disadvantages of the conventional systems, it is an exemplary feature of the present invention to provide a solution to cable operators to address cable leakage causing interference in the LTE band.

It is another exemplary feature of the present invention to provide a method and structure in which cable operators can prioritize cable leakage based on interference severity on surrounding LTE service.

It is another exemplary feature of the present invention to provide a computerized tool that helps cable operators to allocate repair resources in their service area in a manner based upon the severity of interference of detected cable leakage.

Therefore, in a first exemplary aspect, described herein is a method of conforming to cable leakage compliance level requirements, including calculating, using a processor on a computer, a priority of repairs for cable leakage over a cable operator service area; and providing a result of the priority calculation, thereby permitting higher priority leaks to be identified and repaired, wherein the calculating of priority comprises: storing geographical locations of cell towers affecting a service area being evaluated; receiving data related to cable leakage sources; receiving data related to wireless service quality, if available; and exercising, using the processor on the computer, a prioritizing algorithm that calculates a relative severity of each cable leakage source.

In a second exemplary aspect, also described herein is an apparatus, including a memory that stores geographical locations of cell towers affecting a service area being evaluated and data related to cable leakage sources; and a processor exercising a prioritizing algorithm that calculates a relative severity of each said cable leakage source.

In a third exemplary aspect, also described herein is a non-transitory, computer-readable, storage medium tangibly embodying a program of machine-readable instructions executable by a digital processing apparatus to perform the method of calculating a priority of repairs for cable leakage.

Thus, the present invention provides a computerized tool that permits cable operators to establish priorities for repair of cable leaks in their system. This new tool provides a new mechanism for cable operators that addresses the problem of cable leakage causing interference in the LTE band.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE PRESENT INVENTION

Referring now to the drawings, and more particularly to FIGS. 1-5, an exemplary embodiment of the method and structures according to the present invention will now be described.

As exemplarily described below, the present invention helps cable operators prioritize their resources appropriately to maintain their cable infrastructure in a manner that minimizes the amount of interference with LTE services. If cable operators fail to eliminate leakage interference and the problem continues to grow, the FCC will likely step in and force operators to turn off the 16 QAM channels that occupy the 700 MHz to 800 MHz frequency range. The number of QAMs impacted would increase once the 600-700 MHz spectrum is converted for LTE use. This would have a very damaging and costly impact on the operators.

The present invention teaches that a key to reasonably manage leaks is to prioritize them based on their impact on the both over-the-air services and on their own cable service (ingress).

Cable leakage has previously not caused noticeable interference to cellular services until the emergence of the new 4G LTE technology. This new problem will require a solution to help cable operators minimize interference issues. The present invention provides that solution.

Figure 1:
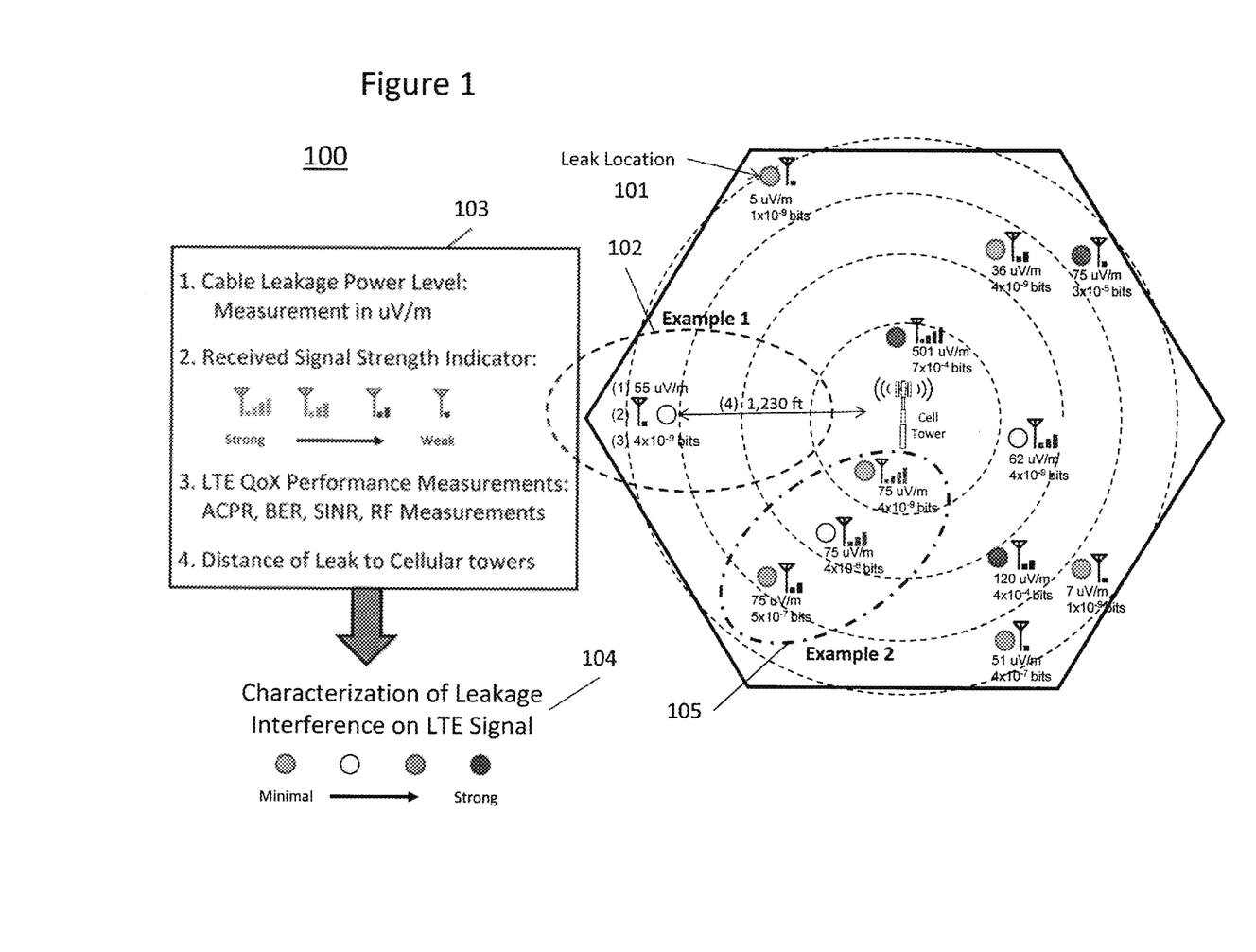
FIG. 1 shows an exemplary cellular site map 100 with data capture parameters, for purpose of explaining the concepts of the present invention.

FIG. 1 shows a typical cell site topology 100 that shows relationships between detected leaks 101 and the related cellular data that would be measured to implement the cable leakage prioritization of the present invention. Looking at Example 1, encircled with a dotted line 102, the present inventor has recognized that there exemplarily are four types of parameters 103 that exemplarily serve as core elements to be used to formulate the potential severity of a cable leak on the LTE signal.

Example 1 shows exemplarily the four measured data elements and the resulting leak characterization for that leak, the leak characterization being exemplarily categorized in one of four categories 104. Each of the individual data pieces is numbered 1-4, with the corresponding description in the outside box 103 on the left side of the figure. The data of Example 1 is obtained through a combination of digital leakage detectors, cellular test equipment, and GPS coordinates. The data is then used to determine an interference severity rating 104 by using an algorithm that pulls from the collected data. The small shaded circles shown in FIG. 1 represent both the detected leak location and its characterized severity. Thus, the leakage characterization of Example 1 is exemplarily shown as having the second level of leakage interference, on a scale of 1 to 4.

Example #2 in FIG. 1, identified as dotted line 105, is used to illustrate that the leakage severity rating is not strictly dependent on the leak power level, but a combination of all the data points. Note that all the leaks within this circle 105 have the same power level 75 µV/m but that the severity rating increases as the leak gets further away from the transmitting cellular tower. This would be a probable scenario as the cellular signal strength becomes weaker as it gets further from the transmitter 105, and thus more susceptible to leakage interference.

Figure 2:
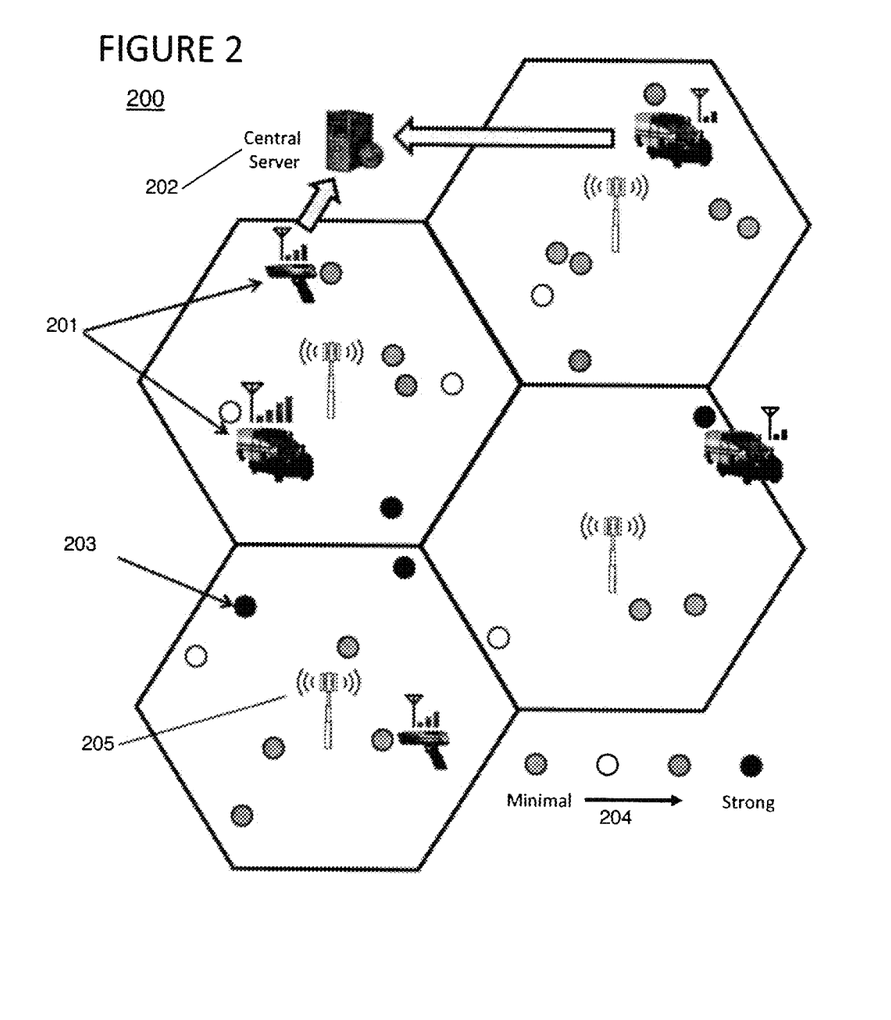
FIG. 2 exemplarily shows a map 200 of multiple cellular sites, to explain data capture described as sent to a central server as data for the prioritization described by the present invention.

FIG. 2 expands the concepts of FIG. 1, to show an exemplary mapping 200 of leakage for multiple cellular sites, and also illustrates the concept that data is captured through the use of both mobile devices and handheld devices 201, as well known in the art, and this data is then sent to a central server 202. By using a fleet of vehicles outfitted to collect and report data, large areas of terrain are covered. Data is continuously collected as the vehicles 201 are driven around and sent via, for example, a cellular connection back to central server 202.

Central server 202 is used as a collection point for all data sent from vehicles and handheld devices 201. The collected data is then used to create prioritization tools and to display the leaks on a mapping platform, such as Google Maps or Microsoft Bing, to be made available, for example, via the Web.

FIG. 2 also exemplarily provides a map view showing how leaks 203 can be represented on a map, using a rating scale 204. Cell tower 205 locations are added to the map to provide a visual perspective of leak severity vs. distance to the cell tower. It would be reasonable to assume that the majority of the worst interference leaks would be located in a zone that is furthest from the towers or has heavy environmental obstructions, however this will vary widely as the variables are, in general, somewhat unpredictable.

Thus, the present invention provides a solution that remedies the problem to provide cable operators with the ability to find and prioritize cable leakage based on the level of interference severity on the surrounding LTE service. As demonstrated in FIGS. 1 and 2, the present invention solves this problem by using data from various measurements and calculations, either in combination or separately. As of the filing of this application, the parameters used to formulate the potential severity of a cable leak on the LTE signal fall into the following categories of measurements:

1. The power level of the leak near its source point;
2. The power level of the downlink and uplink of the LTE cellular signal near the source of the leak (Received Signal Strength Indicator, or RSSI); the uplink RSSI is the more critical measurement parameter;

3. A measure of LTE Quality of Service (QoS) and Quality of Experience (QoE) key performance indicators (KPI) near the source of the leak that provide information on the quality of the link between the receiver and transmitter, such as Signal to Interference plus Noise (SINR), Bit Error Rate (BER), and Data Throughput speeds. An important uplink parameter is the Radio Resource Control (RRC) Reestablishment to Connect count in a given cellular site (EnodeB);

4. A measure of the over-the-air (OTA) noise floor+interference at and surrounding the uplink and downlink of the LTE frequency spectrum as compared to the amplitude of the downlink signal. This measurement would typically be in the form of an Alternate Channel Power Ratio (ACPR); and 5. The distance from the leak to the surrounding cellular towers.

From the above discussion of categories, the present invention relates to calculating priority of repair based on receiving data from one or more of the following four sources of data. First, there is data received for leaks detected in the system using conventional test equipment presently being used by cable operators to detect leaks, such as test equipment from the assignee of the present application. This data can be simply prioritized based on the magnitude of each detected leak. This first source of data can serve as a starting point in establishing priority of repairs throughout the service area, and data from additional sources can then be used to augment the prioritization if such additional source data is available, the additional data being used to better establish priorities based upon how the leaks will impact the LTE service.

A second source of data is downlink information, meaning the information obtained by measuring LTE signal quality from the LTE cellular tower to the cellular user, using test equipment either already developed for LTE testing or yet to be developed as the LTE market expands. Typically, this source of data would be measured using test equipment mounted in trucks that systematically roam over the service area to measure the quality of LTE service related to cell towers sited in a cellular service area or by handheld equipment typically used by LTE field technicians. The present invention teaches to use this second source additionally as a potential source of data for determining priority of cable leakage repairs, since this additional data can be used to predict the interference impact the cable leak is having on the surrounding LTE service. This second data source, if available, would typically be fed into a centralized data collection server receiving data for cable repair prioritization, from the specially-outfitted trucks or handheld devices that are configured to measure LTE quality parameters which have been identified to influence the prioritization of cable leakage interference.

A third source of data is uplink information, meaning the information obtained by measuring LTE signal quality from the cellular users to the surrounding LTE cellular towers. This third source is available from the cellular tower or from the cellular operators, such as Verizon, and requires test equipment located on cell towers. This information is conventionally acquired by cellular operators over their service areas for determining quality of service over their coverage area. This uplink information adds additional information useful for the prioritization calculation of the present invention. Thus, the present invention teaches that this uplink data, conventionally gathered by cellular operators to measure quality of service, can augment other data sources for determining priority of repairing cable leaks and would typically be fed into a centralized data collection server.

The above description of the second and third data sources demonstrates that collection of data for the present invention might require cooperation of entities different from the cable operator responsible for repairing their own cable leaks and, more specifically, the LTE operators that overlap in service area. Initial contacts by the present inventor with current LTE operators suggest that the majority of LTE operators would like to work in a cooperative manner to exchange information with cable operators in their service areas, since their own operation would be improved if cable leaks can be repaired efficiently and in a timely manner.

However, it is noted that the present invention is intended to provide prioritization calculations even if either of the second or third data source information is not available. Also note that the first and second data source are under complete control of the cable operator will by itself provide sufficient data to establish a first-level prioritization calculation for the cable repair over the cable operator's service area.

A fourth data source is the distance of detected leaks from cell tower sites located in the cable operation service area. These locations will, of course, be readily available data to the cable operator and can be fed into a centralized data collection server even if the second and third data sources are not being fed into the server.

With the above information, an algorithm is utilized to determine the relative LTE interference severity of the leak near its source. In an exemplary embodiment, a centralized data collection point, such as a server interconnected via the Internet, receives the test data from measurements in the field by testing crews or from data collected from the wireless LTE carriers and uses an algorithm to calculate the relative severity of each detected leak. The testing measurements would typically include measurements of a plurality of parameters for each detected leak, each parameter measurement for that leak providing additional information for the calculation of the relative severity.

Although a centralized server is mentioned as one possible embodiment, it should be clear that data measurements could be reported in other manners, including recording test measurements and then downloading the measurements to a computer upon arrival back to a testing facility or testing station. It is noted that the testing equipment could itself be adapted to record and perform at least portions of calculations of a relative severity algorithm prior to loading its data onto a computer that provides a more comprehensive calculation of the overall algorithm. Alternatively, a conventional test apparatus could be modified to have a portion of the overall algorithm installed so as to calculate an effect due to its tested parameter(s), thereby providing a rough indication of the relative severity algorithm of that detected leak, as based on that measured parameter alone.

The benefit of the exemplary embodiment in which a centralized server receives all measurements from the field and then calculates the relative severity algorithm allows for easier management of the overall testing, easier management of changes to the algorithm, and easier management of the use of the testing data and algorithm results. That is, a centralized server could provide different access of the testing measurements, so that, for example, management at different levels might desire different views of the amount of data. A technician might be permitted only to view the data significant to his own assigned area, whereas his manager would have access to data of all technicians under his supervision.

Therefore, in an exemplary embodiment, the present invention has the capability to measure and ascertain parameters from all measurement categories of data from devices implemented in either a vehicle-mounted or handheld application, as well as uplink data that has been provided by the wireless LTE carriers such as Verizon and AT&T. Location coordinates are also collected at the point of measure to be used in mapping applications. Geographical locations of the cell towers and other relevant structures and landforms, including buildings and other significant rf interferences could be pre-recorded in the server database, for such purpose as, for example, providing a basis for the server to be able to calculate relative distances between a detected leak and the adjacent cell towers and/or other distances that might be useful in a relative severity algorithm.

It should be clear that relative severity could also be calculated from parameters using fewer than these identified measurement categories or using more than these categories. That is, a key concept of the present invention is that cable leaks can be objectively prioritized using an algorithm involving one or more parameters, with additional parameters providing additional information for more sophisticated calculation. Some cable operators may not require the same level of sophistication to establish the relative priority of leakage repairs for their service areas, and some cable operators may not have available data from the third data source described above, because the uplink cellular service quality data is not available for calculation of cable leakage repair prioritization.

The present invention has the ability to utilize any combination of collected data to determine a leakage severity rating or "characterization" of the cable leak. This rating is further evaluated to determine the overall priority of the leak as compared to other leaks in the cable infrastructure.

Thus, the present inventor has recognized that the quality of an LTE service at any given location is influenced by many variables that make it difficult to create a prioritization algorithm that is based on a fixed formula, although an exemplary relative severity algorithm is discussed in more detail below. A key objective of this invention is to identify which leaks are causing harmful interference to the LTE service, and it should be noted that different degrees of sophistication might be beneficial to different operators.

Experiments and measurements by the present inventor has demonstrated that the LTE services that are the most susceptible to being impacted to cable interference are those service areas which have poor LTE service quality, particularly in the upstream direction. If the service quality is poor due to the existing environmental conditions, adding additional cable interference to these locations could push poor performance into unacceptable performance.

In addition, if a cellular site has poor LTE performance without the addition of cable interference, the LTE wireless carriers already have the means to know this information. They have the ability to measure the LTE service quality of their coverage areas such as the uplink RSSI levels and the RRC Reestablishment count. They will also receive customer complaints about service quality in those areas as well. Thus, the poor performing areas have already been identified by the wireless providers as being high problem areas. If a cable leak is found by the wireless providers in one of these problem areas, it may be reported as a source of harmful interference solely based on its proximity to a low performing service area.

Given this background information, the prioritization algorithm gives additional weighting to those metrics that indicate the LTE service quality in a given area. Based on experience to date, the present inventor has recognized that the primary metrics that would have the heaviest weighting are the uplink RSSI levels and the RRC Reestablishment count. Thus, it should be clear that this single parameter in combination with measured leakage levels could be the basis of a possible relative severity algorithm by simply normalizing the measurements of the detected leaks and sorting the leaks according to their normalized measurements of this parameter combination.

From a downstream perspective, a continuous measurement of the OTA noise floor plus interference at or near the LTE uplink and downlink frequencies (ACPR) would have the next weighting priority.

A more accurate measurement of the noise floor would be taken near the uplink and downlink frequencies as to avoid the power levels from the actual LTE service. An area with a poor over-the-air noise floor without the additional cable interferers will inherently be an area that will deliver a low quality LTE service. This provides areas that have a higher probability of being effected by cable interference and generating customer complaints. In order to minimize random or abnormal noise floor elevations, an averaging of the noise floor for a given location is kept on file. Other KPIs such as data throughput, SINR, RSRQ, EVM, etc. are also continuously monitored to be used to further prioritize the severity of the LTE service quality near leakage sources in these target areas.

Figure 3:
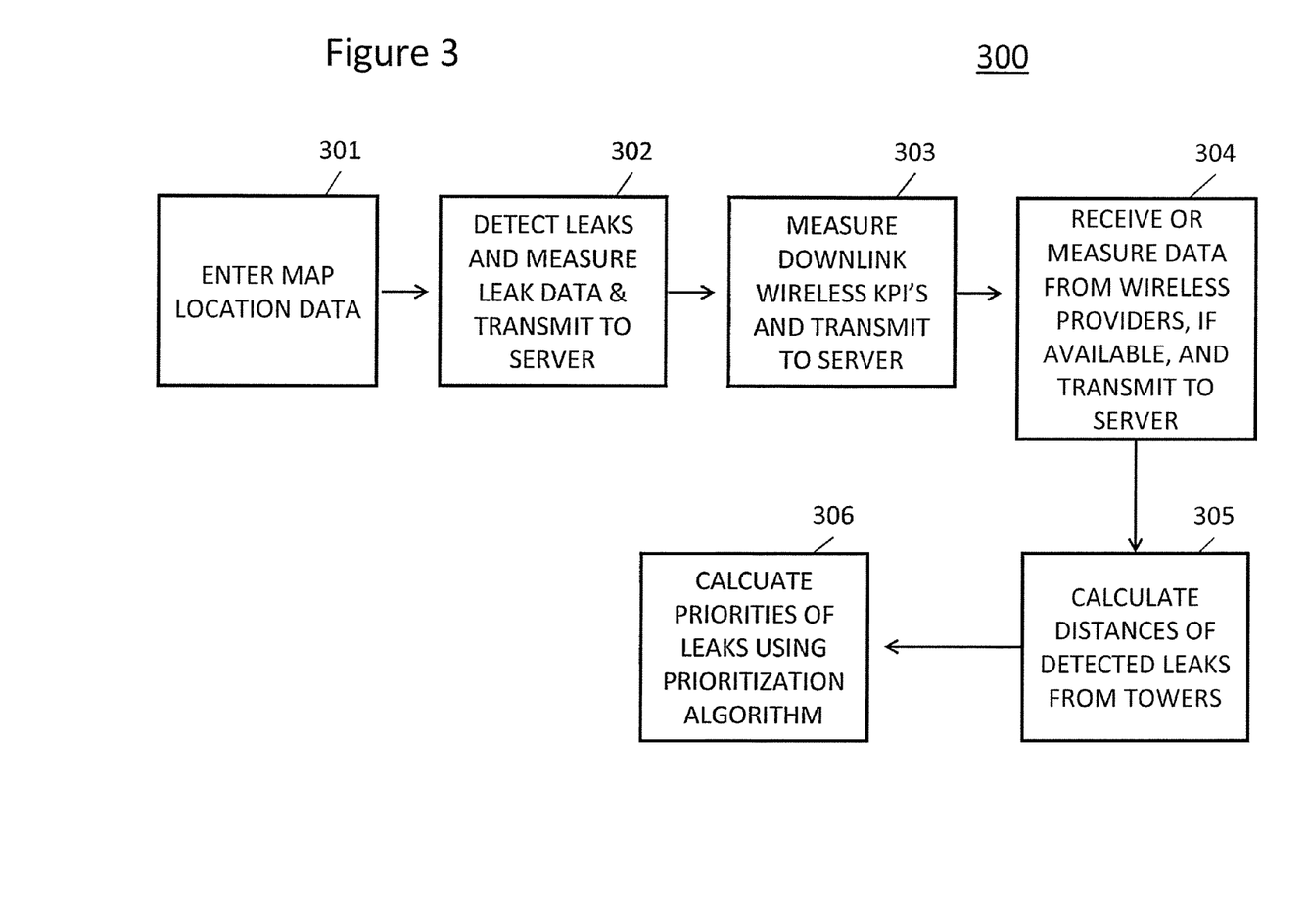
FIG. 3 shows in flowchart format 300 the prioritization method of the present invention.

Therefore, as shown in the flowchart format 300 of FIG. 3, one of the methods that is used to determine the severity that a cable leak is having on a LTE service is to continuously monitor the uplink RSSI, measure the primary LTE KPIs such as the RRC Reestablishment count, measure the ACPR of the downstream and upstream channels, and measure the cable leakage power using a vehicle-mounted device. The OTA field strength of cable leakage is directly proportional to the distance to the leak source which accounts for free space air loss, thus the level of the detected leak will need to be adjusted by the approximate distance between the leakage source and the point of measurement Thus, as a vehicle equipped with both cable leakage and LTE monitoring gear approaches a leak, the power level of the leak will continue to rise as the vehicle approaches the leak until it hits the peak—usually the point at which the vehicle is closest to the leak. As the vehicle moves away from the leak, the power level of leak will start to diminish.

This peak leakage level information is used in combination with the continuous noise floor measurements to determine if changes in the noise floor are potentially due to a leak. The noise floor would elevate and decrease relative to the power level of the leak as the vehicle approaches and moves away from the leak. The delta between the noise floor level at a far distance from the leak (e.g., d>1,000 ft), as compared to the noise level where the peak leakage level is measured (delta in ACPR readings) provides a measurement parameter that is weighted accordingly in the algorithm to determine the impact severity. A change in the other LTE KPIs before, at the leakage peak, and after a vehicle moves past a leakage source will also provide additional weighting to the algorithm.

Exemplary Cable Leakage Severity Formulas

Based on the discussion above concerning information potentially useful for calculating of priority for cable leakage repair, an exemplary cable leakage severity would be an algorithm based on the summation of key measured parameters multiplied by a weighting factor:

$$\text{Relative } LTE \text{ Interference Severity} = \sum_i k_i \cdot \text{factor}_i,$$

where i is the factor index, $k_i$ is a weighting coefficient of that factor, and $\text{factor}_i$ is each of the various parameters identified in the present invention, as expressed in a normalized form for each detected leak.

Although a summation is used in the above-described exemplary algorithm, it should be clear that an alternative algorithm, perhaps based on multiplication, could also be used to determine an objective relative severity for each detected leak location. In the context of the present invention, a "relative severity leakage" algorithm is intended to mean any calculation that provides an objective relative indication for each detected leak, using one or more parameter measurements at or near that leak location that would relate to the impact of that leak location on LTE service in the cable service area.

Typically, depending upon the number of parameters used, there will be one or more processings to normalize the parameter measurements into factors throughout the service area under evaluation. This normalization might involve, for example, using a maximum measured value of any one parameter throughout the evaluation area as corresponding to 100, with lesser measured values being normalized relative to this maximum measured value. With other parameters, normalizing the measurements might be based on a maximum theoretical value for that specific parameter, or upon the relative effect of the minimum and maximum values on the algorithm, meaning that a large measurement value would be normalized to correspond to a small value when used in the algorithm As of the filing date, the present inventor has discovered that there exemplarily are six parameters considered to be most significant to a relatively sophisticated relative severity algorithm, although fewer than six could be used and additional parameters might be discovered for additional sophistication and resolution. These six parameters are:

1. Leakage Power Level, referenced to 10 feet from a source of leakage, typically measured in µV/m;
2. Adjacent Channel Power Level, measured from the center of the LTE downlink and an adjacent channel at a defined resolution bandwidth (RBW), typically measured in dB;
3. Received Signal Strength Indicator (RSSI) of both the LTE downlink and uplink signaling, typically measured in dBM (this is actually two individual parameters, one downlink signal and one for the uplink signal;
4. RRC Reestablishment to Connect count, typically measured as a numerical counter over a specified period of time;
5. Error Vector Magnitude (EVM) of the LTE signal, typically measured in dB; and
6. Distance of a leak to surrounding cellular sites, exemplarily calculated by determining the geographical location of a leak by, for example, GPS, relative to the previously-measured GPS coordinates of the cellular sites, although other distance measurement mechanisms could be used. The units used to express this distance are not so important, as long as the same distance units are used throughout the area under evaluation.

Because the parameters are not all measured in the same units and possibly have different measurement ranges, they typically will undergo a normalization processing to a common measurement scale (factor conversion) throughout the service area under evaluation. Thus, each parameter would have an associated useable measurement range which can be converted to a scale of 1 to 100, where 1 is the best possible measurement and 100 is the worst possible measurement.

For example, the useable measurement range on the Leakage Power Level might be between 5 µV/m and 2,000 µV/m. Converting to a scale of 1 to 100 would mean 5 µV/m=1 and 2,000 µV/m=100, with each unit on the 1-100 scale representing a range of 20 µV/m. A 500 µV/m leak would be assigned a value of 25 in this example.

Similarly, each of the other parameters could be converted to a similar appropriate scale, such as 1-100, using this same methodology. Once all parameters are normalized to an objective value (e.g., "factor", in the summation algorithm), a weighting coefficient is used to give greater weights to those parameters having a greater effect on the severity, as a proportional impact on the resulting outcome. A weight coefficient of zero could also permit one or more parameters to be removed from the resulting outcome, thereby providing flexibility on the implementation of the algorithm.

It is also noted that either the initial normalization processing or the design of the algorithm might require that data measurements be converted into a format so that all parameters are "working together" relative to the effect on LTE service. For example, as explained above, poor quality of LTE will amplify the effect of any cable leak in that area. If we look at the types of measurements discussed above, the present invention can be viewed as describing different combinations (e.g., embodiments) for a prioritization algorithm, with the leakage data being mandatory, as initial data.

The combinations to prioritize leakage could then potentially be based on:
1. Leakage data only, if no LTE data is available
2. Leakage data+uplink data
3. Leakage data+downlink data
4. Leakage data+uplink data+downlink data The geographical location of the cellular sites could also be added to each of the combinations above, as well. However, a preferred embodiment of the present invention provides a computerized tool having generic capability, in which the algorithm provides a prioritization result based upon a setting by the user, or based upon autonomously accommodating whichever of the above combinations are supported by the measurement data stored in a database when the algorithm is requested to provide its prioritization result.

Exemplary Method of Implementation

In view of the discussion above, the details of an exemplary embodiment is demonstrated in flowchart format 300 of FIG. 3. In step 301, geographic coordinates of significant landmarks of features of the service area under evaluation are preliminarily entered into a server database, including the geographic location of cellular towers located in the service area or cellular towers outside the service are that would have an effect on the results of the interference algorithm. Additional map information, such as locations of roads, local topology and significant landforms, and significant buildings could also be entered, as potentially useful for presentation of the data to users. Any mechanism used to determine geographic location, such as GPS (global position system) coordinates or locations from a survey map could be used as the source of information.

In step 302, measurements are taken throughout the service area, typically by one or more measurement teams, using test equipment already known in the art, to locate cable leaks, for data from the first data source discussed above, and locations and measurements of the leaks are sent to the central server, using, for example, a wireless or network communication channel. In addition, in step 303, for the second data source information, the downlink KPI's (Key Performance Indicators) are taken throughout the service area by one or more measurement teams, using equipment already known in the art to measure LTE quality of service parameters. This second source of data along with its associated location information are sent to the central server, using, for example, a wireless or network communication channel. In addition, in step 304, for the third data source information, if available, the uplink, quality of service parameter measurements, as typically might be provided by the wireless LTE providers serving the area, are received as input data. Although FIG. 3 shows data entry and receipt as sequential events, steps 301-304, it would be clear to one of skill in the art that this data receipt and storage would actually be a continuous operation with no particular order. In step 306, the algorithm is executed, as described above, including initial calculation in step 305 of distances of each detected leak from the cellular towers, as well as any normalization processing required for the specific algorithm involved. It should be understood that the algorithm could be executed over the entire service area under evaluation, or could be executed for only a selected portion of the area, using data only for that selected portion.

Although not specifically shown, a user request would initiate calculations and would permit the data to be displayed, in a format selected by the user, including formats for the results of the prioritization, as well as potentially input data and map features to be displayed. For example, a user might request a map display, similar to that of FIG. 2, in which the detected leaks are displayed, along with relevant data including the severity level for each detected leak.

It is further noted that a relative prioritization result could be achieved in several different mechanisms. For example, once the data for each detected leak is exercised by the prioritization algorithm, the calculated results for all the leaks could simply be sorted, thereby, the result for each detected leak can be assigned relative to the calculated results of all of the other detected leaks. Another prioritization mechanism could be executed by predetermining a plurality of categories, with each detected leak being placed into one of these predetermined categories after data relative to that leak has been processed by the prioritization algorithm, similar to the four categories 104 exemplarily shown at the lower left of FIG. 1. In another exemplary mechanism, a predetermined number of categories could be assigned based on the processing results for all the detected leaks. Thus, the four categories 104 shown in FIG. 1 would result from first processing the data received for all detected leaks over the service area (or a part of the service area) and each leak then placed into one of a predetermined number of categories, as based upon the range of calculations for those leaks.

Exemplary Hardware Implementation

Figure 4:
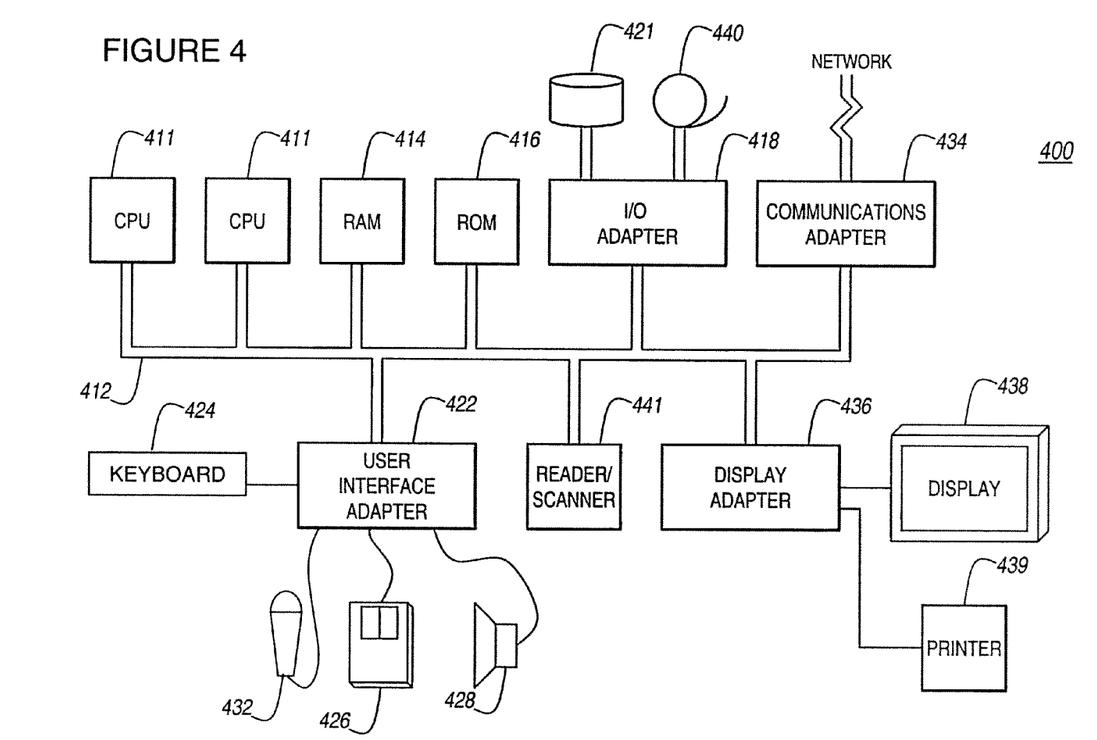
FIG. 4 illustrates an exemplary hardware/information handling system 400 for incorporating the present invention therein.

FIG. 4 illustrates a typical hardware configuration of an information handling/computer system 400 in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In the context of the present invention, the adapter 434 would be the interface for data fed from wireless LTE providers and/or reports from measurement teams. The information handling/computer system 400, if serving as a centralized server, could also be interfaced to one or more transceivers (not shown), which, in turn, interface with antennas exchanging communications directly with the wireless LTE providers and measurement teams.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 411 and hardware above, to perform the method of the invention.

This signal-bearing storage media may include, for example, a RAM contained within the CPU 411, as represented by the fast-access storage for example. Alternatively, the instructions may be contained in another signal-bearing storage media, such as a magnetic data storage diskette 500 (FIG. 5), directly or indirectly accessible by the CPU 411.

Figure 5:
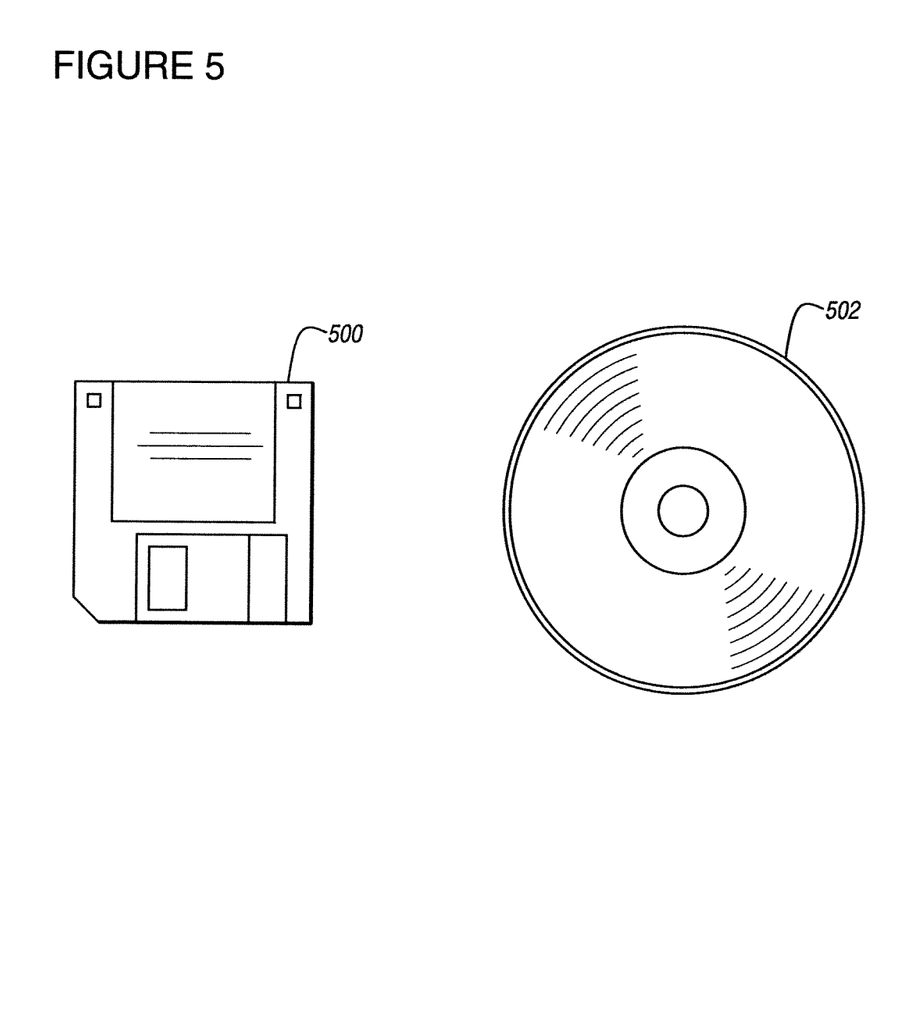
FIG. 5 illustrates exemplary non-transitory signal bearing storage media 500,502 (e.g., storage medium) for storing steps of a program of a method according to the present invention.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission hardware, communication links, and wireless devices, and including different formats such as digital and analog. In an illustrative embodiment of the invention, the machine-readable instructions may comprise software object code.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

I claim:

1. A method of conforming to cable leakage compliance level requirements, said method comprising:
    calculating, using a processor on a computer, a relative severity/priority of repairs for cable leakage over a cable operator service area, said cable operator providing a cable TV service; and
    providing a result of said relative severity/priority calculation, thereby permitting higher priority leaks to be identified and repaired,
    wherein said calculating of relative severity/priority comprises:
        storing geographical locations of transmission facilities for cellular services affecting a service area being evaluated, said cellular services comprising at least LTE (Long Term Evolution)/3G cellular services;
        receiving data related to cable leakage sources;
        receiving data related to wireless service quality, if available; and
        exercising, using said processor on said computer, a prioritizing algorithm that calculates a relative severity of each said cable leakage source.

2. The method of claim 1, wherein said received data is preliminarily normalized.

3. The method of claim 1, wherein said prioritizing algorithm is formulated to provide an emphasis to service areas having received data indicating a poor wireless service quality.

4. The method of claim 3, wherein said relative severity is based upon, for each detected cable leakage source, a combination calculation comprising at least one of:
- an uplink RSSI (Received Signal Strength Indicator) level;
- an RRC (Radio Resource Control) Reestablishment to Connect count in a given cellular site;
- a downlink RSSI level;
- a downlink Error Vector Magnitude (EVM) of an LTE/3G signal; and
- an Adjacent Channel Power Level (ACPL) of an LTE/3G signal.

5. The method of claim 4, wherein a priority of leakage repair is calculated by sorting, for all detected cable leakage sources, the combination calculation results.

6. The method of claim 1, wherein said computer comprises a server having a role for at least one of a centralized data collection for said service area and a centralized calculation for said service area.

7. The method of claim 1, wherein said received data related to said cable leakage sources comprises data reported from at least one of:
- test data from at least one measurement taken from said service area for locating said cable leakage sources;
- a calculation of distance between said cable leakage sources and cellular transmission facilities in areas of said cable leakage sources;
- test data from at least one measurement taken from said service area related to said downstream measurement key performance indicators (KPIs); and
- data provided by the wireless carriers as related to uplink wireless service quality in areas of said cable leakage sources or measured data from said cellular transmission facilities in areas of said cable leakage sources.

8. The method of claim 1, wherein said received data comprises one or more of:
- a Leakage Power Level, referenced to 10 feet from a source of leakage;
- an Adjacent Channel Power Level (ACPR), measured from a center of an LTE/3G downlink and an adjacent channel at a defined resolution bandwidth (RBW);
- a Received Signal Strength Indicator (RSSI) of LTE/3G downlink signaling;
- a Received Signal Strength Indicator (RSSI) of LTE/3G uplink signaling;
- a Radio Resource Control (RRC) Reestablishment to Connect count;
- an uplink data throughput measurement;
- a Bit Error Rate (BER) measurement on the uplink or downlink signaling;
- a Signal to Noise plus Interference (SINR) on the uplink or downlink signaling;
- an Error Vector Magnitude (EVM) of an LTE/3G signal; and
- a distance of a leak to surrounding cellular sites.

9. The method of claim 1, wherein said prioritizing algorithm provides a priority of leakage repair by one of:
- sorting, over a set of detected leaks, a calculation using said received data, as normalized and as weighted for each of a parameter in said data, said sorting thereby establishing a relative priority of the set of detected leaks; and
- assigning each said detected leak to a specific category of priority of leakage repair, based upon a result of exercising the prioritizing algorithm for data of that detected leak, a plurality of possible different categories having been predetermined.

10. The method of claim 1, wherein said transmission facilities for cellular services comprise at least one of:
- LTE/3G cellular towers; and
- LTE/3G small cells comprising any of femtocells, picocells, and microcells.

11. An apparatus, comprising:
- a memory that stores geographical locations of transmission facilities for LTE (Long Term Evolution) and 3G cellular service affecting a service area being evaluated and data related to cable leakage sources of a cable network providing cable TV service in said service area; and
- a processor exercising a relative severity/prioritizing algorithm that calculates a relative severity/repair priority of each said cable leakage source.

12. The apparatus of claim 11, as comprising a centralized server servicing and collecting data for said service area.

13. The apparatus of claim 12, further comprising an interface to a transceiver that communicates with at least one of:
- test data from at least one measurement taken from said service area for locating said cable leakage sources;
- test data measuring downlink signal quality over said service area;
- uplink data provided by the wireless carriers using said LTE/3G transmission facilities or measured from said LTE/3G transmission facilities; and
- locations of wireless carrier LTE/3G transmission facilities that might be affected by said cable leakage sources,
- wherein said LTE/3G transmission facilities comprise LTE/3G cellular towers and/or LTE/3G small cells comprising any of femtocells, picocells, and microcells located in said service area.

14. The apparatus of claim 11, further comprising an interface to permit a user to retrieve at least one of:
- calculation results of said prioritizing algorithm;
- said locations of cable leakage sources; and
- said geographical locations of transmission facilities affecting a service area being evaluated or said data related to cable leakage sources, in a format requested by said user.

15. The apparatus of claim 11, wherein a priority of leakage repair is calculated by sorting, for all detected cable leakage sources, a calculation based on a combination of parameters measuring wireless service in an area of each detected cable leakage source.

16. The apparatus of claim 11, wherein said received data comprises one or more of:
- a Leakage Power Level, referenced to 10 feet from a source of leakage;
- an Adjacent Channel Power Level, measured from a center of an LTE/3G downlink and an adjacent channel at a defined resolution bandwidth (RBW);
- a Received Signal Strength Indicator (RSSI) of LTE/3G downlink signaling;
- a Received Signal Strength Indicator (RSSI) of LTE/3G uplink signaling;
- a Radio Resource Control (RRC) Reestablishment to Connect count;
- an Error Vector Magnitude (EVM) of an LTE/3G signal; and
- a distance of a leak to surrounding cellular sites.

17. The apparatus of claim 16, wherein said prioritizing algorithm provides a priority of leakage repair by one of:

sorting, over a set of detected leaks, a calculation using said received data, as normalized and as weighted for each parameter, said sorting thereby establishing a relative priority of the set of detected leaks; and assigning each said detected leak to a specific category of priority of leakage repair, based upon a result of exercising the prioritizing algorithm on data for that detected leak, a plurality of possible different categories having been predetermined.

18. A non-transitory, computer-readable, storage medium tangibly embodying a program of machine-readable instructions executable by a digital processing apparatus to perform a method of calculating a priority of repairs for cable leakage, said method comprising:

storing geographical locations of transmission facilities for LTE (Long Term Evolution) and 3G cellular service affecting a service area being evaluated;

receiving data related to at least one of cable leakage sources of a cable network providing cable TV service in said service area and wireless service measurements in areas of said cable leakage sources; and     exercising, using a processor on a computer, a prioritizing algorithm that calculates a relative severity of each said cable leakage source.

19. The storage medium of claim 18, as comprising one of:
- a memory device storing said instructions as a program currently being executed by said computer;
- a memory device storing said instructions as a program capable of being executed by said computer;
- a memory device storing said instructions and intended to interface with said computer for purpose of downloading said instructions onto a memory of said computer; and
- a memory device on a server on a network storing said instructions and intended to interface with said computer for purpose of downloading said instructions onto a memory of said computer via the network.

20. The storage medium of claim 18, as comprising a memory device on a centralized server servicing and collecting data for said service area.

\* \* \* \* \*